United States Patent [19]

Stephenson, III

[11] Patent Number: 5,267,046
[45] Date of Patent: Nov. 30, 1993

[54] COLOR BALANCE IN SCANNING THERMAL PRINTER USING PRIMARY AND VARIABLE DENSITY FILTERS

[75] Inventor: Stanley W. Stephenson, III, Spencerport, N.Y.

[73] Assignee: Eastman Kodak Company, Rochester, N.Y.

[21] Appl. No.: 755,899

[22] Filed: Sep. 6, 1991

[51] Int. Cl.⁵ .......................... H04N 1/40; G03F 3/08; B41J 15/16
[52] U.S. Cl. .................... 358/296; 358/518; 346/76 PH
[58] Field of Search ............... 358/296, 75–80; 346/76 PH; 359/578, 587, 589, 590

[56] References Cited

U.S. PATENT DOCUMENTS 5,172,136  12/1992  Stephenson III .............. 346/76 PH Primary Examiner—Benjamin R. Fuller
Assistant Examiner—Eric Frahm
Attorney, Agent, or Firm—John L. James

[57] ABSTRACT

A scanning thermal dye printer has a scanning station positioned to scan a color input image and control dye deposited in a dye deposition station that is disposed to reproduce the color input image. A primary filter is adapted to remove a quantity of the color not absorbed by a deposited dye, and at least one variable density filter provides fine control of the light components associated with the deposited dye. A prescanning station determines a color balance for an image and communicates color balance information to the color station controller. The color station controller positions the variable density filter in response to receiving color balance information.

14 Claims, 2 Drawing Sheets

COLOR BALANCE IN SCANNING THERMAL PRINTER USING PRIMARY AND VARIABLE DENSITY FILTERS

FIELD OF THE INVENTION

The present a invention relates generally to thermal printing, and more specifically to a color scanning thermal; printer with multiple image scanning stations and multiple printing stations.

BACKGROUND OF THE INVENTION

In a thermal printer, a color print is formed by depositing dye onto a receiver. The dye is typically deposited one color at a time onto the receiver in an overlaid fashion by first depositing yellow, followed by magenta, and followed by cyan. The quality of a print includes how well the individual colors are aligned on the receiver. In other words, if each of the colors is deposited exactly directly on top of the other, there is high print quality. If, on the other hand, the colors are not perfectly aligned, even by a small increment, the image is not lists clearest and print quality is lost. Print quality is a concern with all thermal printers, even drum printers where the receiver is fixed to one drum and rotates three times to receive the yellow, magenta and cyan dye.

In a scanning thermal dye printer, the image source may pass through three scanning stations, one for each of the yellow, magenta and cyan colors. It is desirable that the finished print have colors matching the input image as closely as possible. It is known that a color image can e separated into the primary colors, but that such color separation may be a complicated procedure and may not exactly produce the colors desired. It is desirable to have a simple, inexpensive apparatus for separating the colors in the input image. Accordingly, it will be appreciated, that it would be highly desirable, to have a filter assembly for controlling the light components and achieving color balance.

SUMMARY OF THE INVENTION

The present invention is directed to overcoming one or more of the problems set forth above. Briefly summarized, according to one aspect of the present invention, a scanning thermal dye printer, comprises a scanning station positioned to scan a color input image and control dye deposited in a dye deposition station disposed to reproduce the color input image, a primary filter adapted to remove a preselected quantity of the colors not absorbed by an associated deposited dye, and at least one variable density filter to provide fine control of the light components associated with the deposited dye.

According to another aspect of the present invention, a scanning thermal dye printer comprises a plurality of scanning stations positioned to sequentially scan an input image and generate color information equivalent to the dye color deposited in a series of thermal dye deposition stations disposed to reproduce the input color image, a source of white light, a primary filter for removing a preselected amount of the white light components not absorbed by the associated deposited dye, and at least one variable density filter having an absorption of the white light components absorbed by the deposited dye in a preselected range.

The primary filter removes a majority, preferably at least ninety per cent, of the color from the light source that is not absorbed by the associated thermal dye. The primary filter may contain thermal dye as a filtering agent. There is at least one variable density filter that removes from about zero to about ten per cent of one primary color absorbed by the associated dye. Additional variable density filters remove from about zero to about ten per cent of the other primary color absorbed by the associated dye.

A prescanning station determines a color balance for an image and communicates color balance information to the color station controller. The prescanning station determines a variable color mix for each image. The color station controller positions variable density filters in response to receiving color balance information. Adjustment means on the variable absorption filters change color balance. Control means are disposed to receive information on color mix on an image by image basis and actuate the adjustable variable filters to improve the printed quality of the image.

These and other aspects, objects, features and advantages of the present invention will be more clearly understood and appreciated from a review of the following detailed description of the preferred embodiments and appended claims, and be reference to the accompanying drawings.

DETAILED DESCRIPTION OF THE PREFERRED EMBODIMENTS

Figure 1:
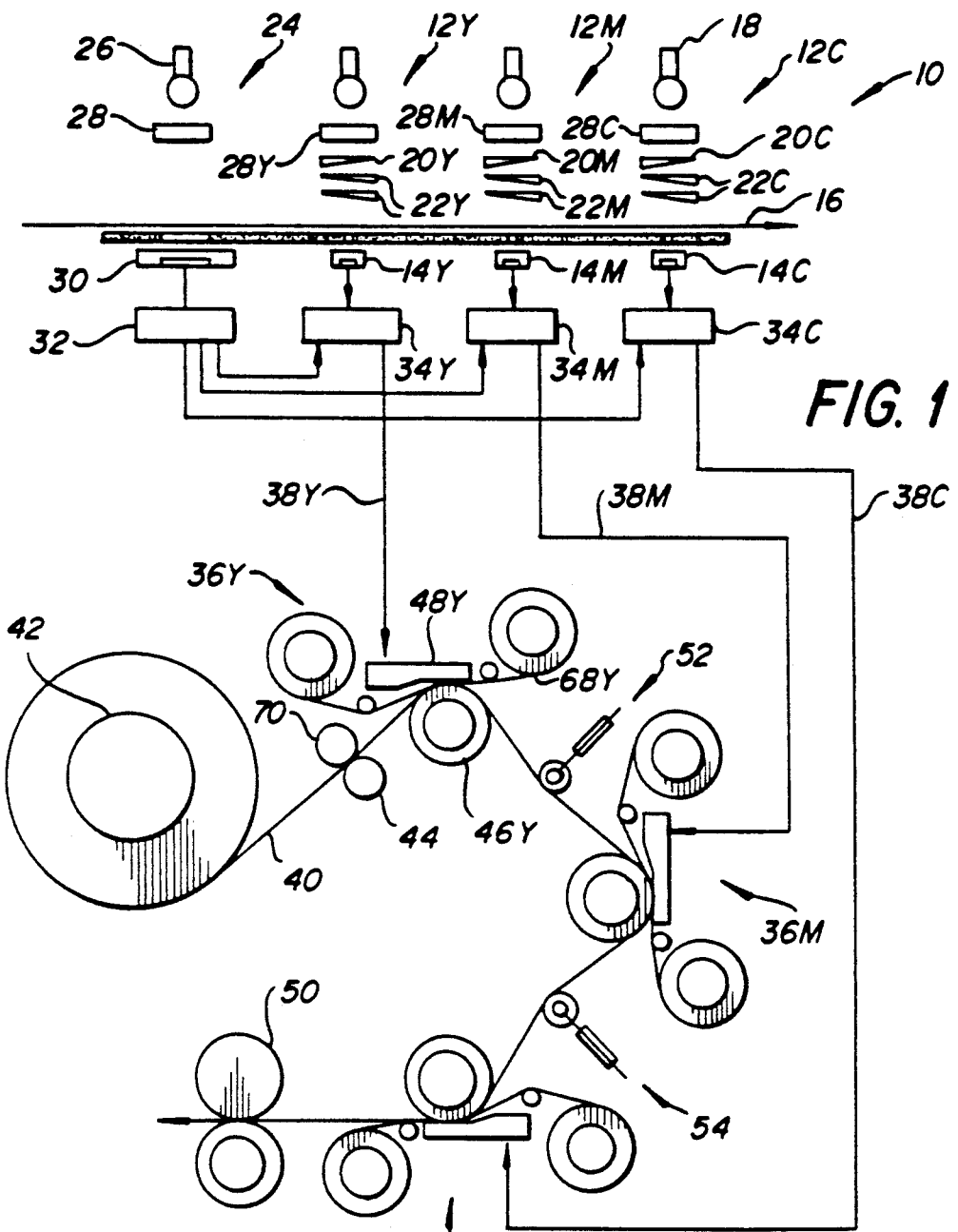
FIG. 1 illustrates a preferred embodiment of a thermal printing minilab concept that uses a plurality of scanning stations having linear scanning arrays positioned to sequentially scan an input color image, and a plurality of printing stations to reproduce the input image in accordance with the present invention.

Referring to FIG. 1, a thermal printing minilab concept is illustrated which uses a scanning thermal dye printer 10. There is a plurality of scanning stations 12 having linear scanning arrays 14 positioned to sequentially scan an input color image 16 and generate color information equivalent to a dye color deposited to reproduce the input color image. A white light source 18 is included in each scanning station 12. In a color system there are preferably three scanning stations, one for yellow, one for magenta, and one for cyan, as represented in the drawing as 12Y, 12M and 12C. A primary filter 20 is adapted to remove a preselected quantity of the colors imparted not absorbed by the associated deposited dye. A variable density filter 22 provides fine control of the light components associated with the deposited dye.

There is also a prescanning station 24 that includes a light source 26, a light diffuser 28, and a CCD color scanner 30. A color balance controller 32 is associated with the prescanning station 24. The prescanning station 24 determines a color balance for an image 16 and communicates color balance information to the color balance controller 32. The color balance controller 32 communicates with the scanners 14 and head drive controls 34 for the scanning stations 12.

The scanning thermal dye printer 10 includes a plurality of thermal dye transfer or printing stations 36Y, 36M and 36C, which respectfully print yellow, magenta, and cyan dye colors. Each of the thermal dye transfer stations 36Y, 36M, 36C is responsive to information from a selected one of the linear scanning arrays with the dye printing station 36Y communicating with the yellow scanning station 12Y via communication line or path 38Y, with the magenta printing station 36M communicating with the magenta scanning station 12M via path 38M and with the cyan printing station 36C communicating via path 38C with the cyan scanning station 12C.

A thermal dye receiver 40 emanates from a supply spool 42 and proceeds through rollers 44 to the yellow printing station 36Y. In the yellow printing station, the receiver 40 passes over the printer platen drum 46 to be selectively engaged by the print head 48 under the control of the head drive 34Y. Upon exiting the yellow printing station 36Y, the receiver 40 advances toward the magenta printing station and onto the cyan printing station before exiting between rollers 50.

There is at least one roller assembly 52 positioned between the yellow and magenta thermal printing stations 36Y and 36M, and at least one roller assembly 54 positioned between the magenta printing station 36M and the cyan printing station 36C. The roller assemblies 52, 54 are adjustable for positioning one color plane relative to another color plane to obtain a quality color print.

Figure 2:
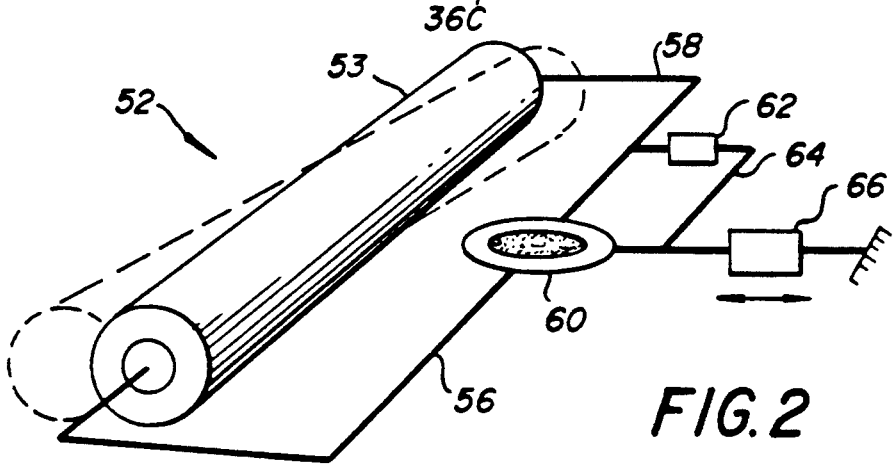
FIG. 2 is somewhat enlarged diagrammatic view of a guiding roller assembly used to guide the receiver web in the printing stations of FIG. 1.
Figure 3:
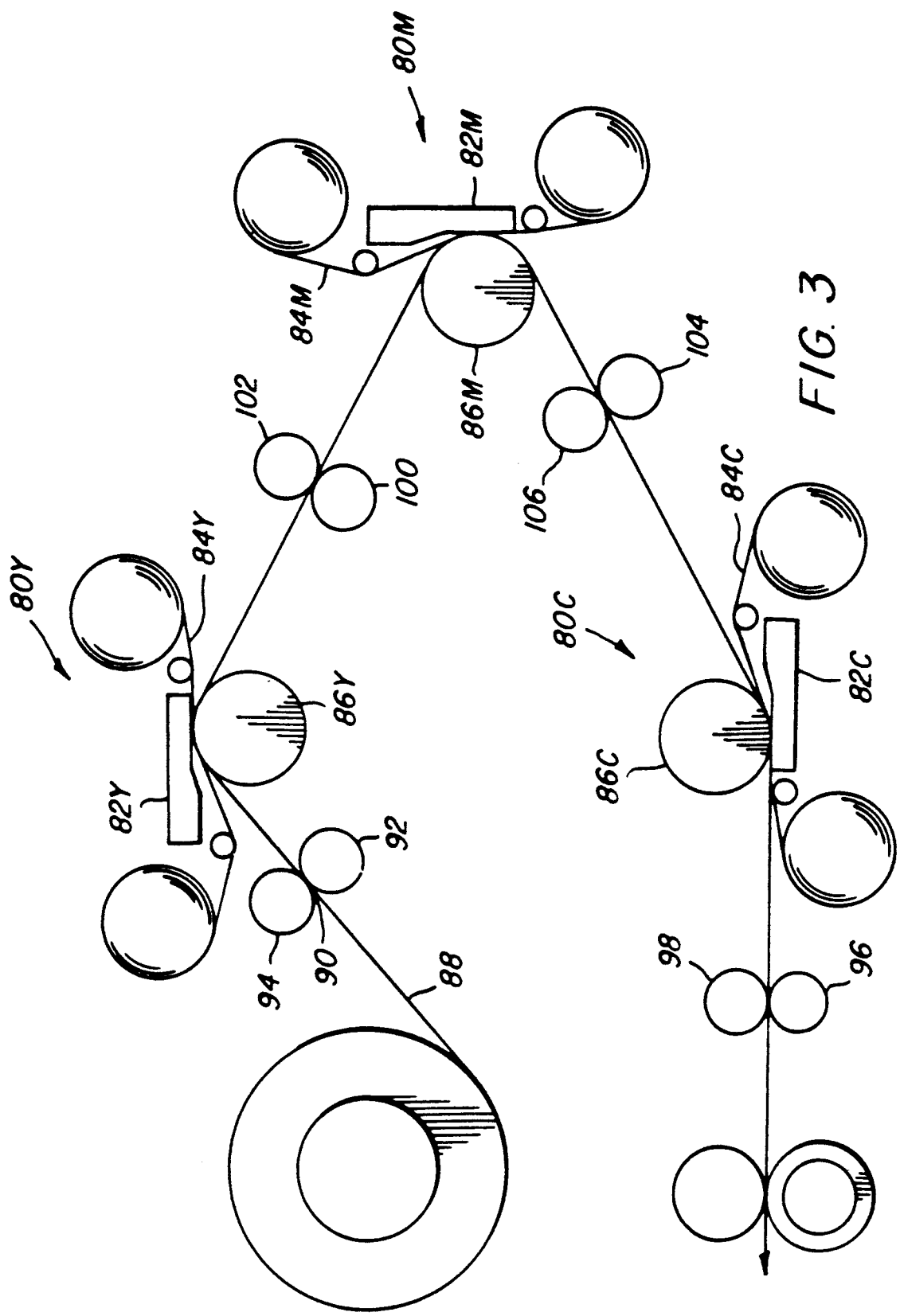
FIG. 3 is a diagrammatic view illustrating the tradient filters of FIG. 1 in greater detail.

Referring to FIG. 2, the roller assemblies 52, 54 are identical, and roller assembly 52 is illustrated in greater detail in FIG. 2. A tension roller 53 is mounted in a framework that has a left arm 56 and a right arm 58 that are connected to a pivotal mounting 60. The left and right arms 56, 58 respectively engage the left and right end portions of the tension roller 53. Attached to one of the arms 56, 58 is an adjustment screw 62 that is also attached to a member 64 that attaches to the pivot point 60. The member 64 is also attached to a second adjustment screw 66 that has one end attached to the pivot point 60 and the other end attached to the framework of the printer. Basically, adjustment screw 66 controls the movement of the center portion of the tension roller 53 towards and away from the receiver 40 while the adjustment screw 62 controls the tilt of the tension roller 53 across the receiver 40.

Again referring to FIG. 1, in the scanning thermal printer 10, a 35 mm negative or other image source 16 is moved between three successive scanning stations 12. In the scanning stations 12, the scanning elements preferably consist of a linear CCD array 14. There are three linear CCD arrays 14 that are disposed at a spacing equivalent to the nominal spacing of images on the negative 16. Each scanning array is illuminated by filtered light that corresponds to the light that is absorbed by one of a series of thermally transferrable dyes such as yellow, magenta, and cyan.

Associated with scanning station 12 is a thermal printing station 36 that deposits the dye associated with the illuminating light. A source image, in one case a 35 mm negative, is mounted on a plate that provides a feed path for the negative 16. An elastomer belt or other means is used to transfer the image 16 through each of the color scanning stations 12. The source image 16 is scaled to linear scanning aray 14 using optical elements not shown. Each scanning array 14 has an adjustment provided to allow the sensing elements to be aligned at the same point on the film 16. This adjustment can be done using a tees negative with target lines. The test image is passed through each successive station an 12Y, 12M and 12C, and alignment of the scanning arrays is made so that the scanning array elements sense the same points of the film 16.

Each thermal printing station 36 consists of a thermal head 48, a dye bearing web 68, an a rotating platen 46. The thermal head itself consists of a plurality of resistive elements that are selectively energized. The heat from the resistive elements is transferred to the dye bearing web 68. The heat transfers the dyes from the dye bearing web 68 to the dye receiving web 40. A clamping force is applied between the head 48 and platen 46 to insure good contact between all elements of the printing head 48. The pressure between the head 48 and the platen 46 can be removed to allow for replenishment of the dye bearing web 68 and feeding the receiver 40 through the printer 10.

The dye receiver 40 is supplied as a continuous role that is mounted and fed into a nip formed by capstan roller 44 and a pinch roller 70. A stepper motor (not shown) rotates the capstan roller 44 and provides a controlled advance of the dye receiving web 40. The dye receiver web 40 is kept taut throughout its passage through the by driving each platen roller through a torque clutch (not shown).

The transmission of image data is facilitated by self-contained electronic modules 34 that control the CCD exposure, convert the CCD data to thermal printing data, and contains the head modulator for the associated print heads 48. The electronics 34 operate under control of a master clock or master timing signal that synchronizes all activities in the printer 10. Using the clock signal, the CCD controlled electronics 34 allows the CCD elements to soak for an exposure time, then clocks the line of data out. The values from the CCD 14 are mapped against an array of density values to generate a new value that represents dye density.

The system clock signal may also be used in other controlled electronics within the printer 10 to control the movement of the source image 16 and the dye receiving web 40. Preferably, the motor control electronics divides the master clock signal to achieve a frequency that operates the motor that advances the negative 16 through the film gate. The master clock signal may also be operated on to provide control of the drive motor controlling capstan rollers 44 and 70 that advance the dye receiver web 40. In the printer, the source and printed image are of different sizes. In addition, in any specific embodiment, the drive systems may be different. In such a case, the subclocks of the two drives would typically be different. With the present invention, it is possible to scale all the drive elements so that one divided master clock signal can drive the negative and dye receiver metering. In addition, the electronics that converts the master clock signal to a drive signal for one or both of the two motors may be adjustable to allow fine tuning of the respective drives.

In summary, the scanning printer 10 contains a plurality of scanning stations 12 with each scanning station corresponding to an associated thermal dye deposition station 36. Means are disposed to transfer the scanned information directly to the thermal head. Separate means are used to move the source image and the dye receiver web. A master clock provides synchronization between the movement in the image source and dye receiver, and also the transfer of data from each scanning sensor, to its associated thermal head.

The present invention provides a method of color matrixing in a direct print scanning thermal printer. The printer synchronizes the movement of the source image, typically 35 mm negatives, with the movement of a dye receiving web through thermal dye transfer stations associated with each scanned station. Each station has a CCD imaging element that is controlled to expose and transmit the scanned data serially to a thermal head modulator without intermediate storage. Separate drive means are incorporated in the source image path and the dye receiver path. These drive systems are synchronized to provide proper color registration and scaling to the image. To synchronize these processes, a master clock signal provides for advance of both the source image and the dye receiver web. The same clock signal also acts as the master clock for the image capture and head modulation functions built into the data transfer electronics.

A capstan metering system meters the dye receiving web into the printer stations. At each printing station, the platen rollers are driven through slip clutches that allow the web to be tensioned between stations, but allow the web to be controlled by the metering capstan.

Still referring to FIG. 1, in the scanning printer 10, each scanning station 12 corresponds to an associated thermal dye deposition station 36 and one or more variable color filter arrays 20, 22 are disposed between the light source 18 to each station 12 and the sensor 14 to allow for color balance in the printed image. In the scanning thermal printer 10, the 35 mm negative 16 is moved between successive scanning stations 12. The values that are generated from the CCD 14 will be inversely and nonlinearly proportional to the color of the dye being deposited in an associated thermal printing station 38. The first scanner 12Y analyzes the yellow component of the negative 16 and transfers color mapped values to a thermal dye station 36Y deposits yellow dye. The second scanner 12M analyses magenta and translates data into magenta dye deposits. The third scanner 12C analyzes cyan that is used to control the deposition cyan dye at the cyan dye deposition station 36A.

The movement of the negative 16 is synchronized with the movement of the dye receiving member 40. This means that the image 16 is scanned at different times. It is advantageous to transfer the data directly to the print head 48 as both the negative 16 and the dye receiver 40 move. The direct transfer is preferable to storage of the image data. One difficulty is that the dyes, filters, light sources and scanning elements each have a variable color response. This difficulty is overcome in machines that store the image by blending all three colors of the input color planes in various proportions so that the image corresponds to the original negative. Because the present invention does not have the three color planes of the image available, this digital mixing process is not used.

The present invention provides a new, simple method for achieving color balance at minimum cost. The technique disclosed by the present invention incorporates gradient filters 20, 22 between a white light source 18 and the scanning elements 14 at each station 12. In one preferred embodiment, the elements are arranged between the light source 18 and the negative 16. In a typical color balance, the color balance would consist of 90% of the primary light constituent, and 10% in different proportions of two secondary colors depending on the characteristics of the dyes. As an example, the yellow dye deposition station 36Y would actually filter out red and green colors of white light in a proportion of between 90 and 100%. The 10% balance of the light energy would then be distributed between the red and green components. The majority of the light would be a blue color, which is the component yellow dye absorbs. The following represents a typical range of filtering that will be possible in a typical printer.

TABLE 1

| DYE PRINTED | AMOUNT OF LIGHT ABSORBED | | |
|---|---|---|---|
| | RED COMPONENT | GREEN COMPONENT | BLUE COMPONENT |
| YELLOW | 100.0–90.0% | 100.0–90.0% | 0.0–10.0% |
| MAGENTA | 100.0–90.0% | 0.0–10.0% | 100.0–90.0% |
| CYAN | 0.0–10.0% | 100.0–90.0% | 100.0–90.0% |

The other two components are filtered by separate filters 22 that typically transmit between 0 and 10% of the light to provide color corrected deposition of dyes. The primary filter 20 can be built of the thermal dyes themselves. The first filter could consist of the dye being deposited, typically at a low light absorption. The other two dyes could then be used in the secondary filters 22, deposited at high density that results in a corrected light component associated with the dye. One advantage of this construction of the filters is that the filters would match directly the color response of the thermal dyes. To allow for adjustability, the dyes in the filters could be thermally deposited in a gradient wedge. The filters would be mounted in a frame so that the axis of motion of the frame would correspond to the gradient of the dye. Movement of each filter 20, 22a, 22b by motor 5, 6, 7, respectively, would then allow for color correction of the light (FIG. 34).

To further enhance printing, the prescanning station 24 and the printer 10 evaluates each negative 16 before printing occurs. The prescanning station 24 computes a color balance for that image and transfers the color balance information to the color printing station as the negative 16 moves to it. The color balance controller 32 responds to the color balance and positions the color gradient filter 20, 22 to improve the color balance of each print. The color balance controller 32 could also transmit to the local scanner for adjustment.

Referring to FIGS. 1 and 2, the distance and alignment of the web 40 between color printing stations is critical to image quality. An adjustable idler assembly 52, 54 is positioned between adjacent printing stations to adjust the length of the receiver path between each of, the printing stations 36Y, 36M. Fine adjustment screws 62, 66 are positioned about the tension roller 53 to adjust both the length and skew of the receiver web 40 between dye deposition stations. One fine adjustment 66 adjusts the position of the center of the roller 53 and the other adjustment 62 adjusts the tilt of the roller 53. The interstation roller assemblies 52, 54 are adjusted by the adjustment scares 62, 66 to adjust the registration of a dye plane relative to the other dye frames.

A plurality of dye deposition stations 36Y, 36M, 36C exist so that thermally reactive dyes can be transferred from the dye donor webs 68Y, 68M, 68C to the dye receiving sheet 40. The transfer of dye is accomplished by a series of selectively energizable resistive elements in the thermal head 48. The dye receiving element 40 passes through each station successively and receives dye densities corresponding to color plane densities determined by the image scanning element 14. The adjustable rollers 52, 54 are disposed between the dye depositions station. The interstation rollers are adjusted to adjust registration of a dye plane relative to the other dye frames.

The motion of the 35 mm negative and the movement of the dye receiver occurs in a synchronous manner. A master clock provides the timing for a stepper motor that moves the negative through the film guide. The same clock controls the motion of a stepper motor that rotates the capstan rollers for metering the dye receiving web into the print stations. The platen rollers in each station are driven through a torque controlled slip clutch to provide a pulling tension on the receiver throughout the receiver path. A problem recognized with this printing approach is the steering and alignment of the receiver web 40. The distance between print stations must be controlled to be scaled to the distance between each of the scanning stations. Tolerances in the manufacturing of the printing platens and the location of the thermal heads can also introduce dimensional errors in the system which show up as misregistration of the color planes relative to each other.

The present invention provides an apparatus to correct color plane misregistration in such a printer. This is accomplished by positioning rollers between each of the printing stations. Each roller is positioned at a nominal position in the receiver's path. Adjustment means allow the position of the roller to be adjusted slightly out of the nominal position. The receiver guide roller is mounted in a frame and two threaded rods are rotated to adjust the receiver's path. The printer is then activated and adjustment made to achieve optimal color plane registration. One of the adjustment screws moves the frame to adjust the center length of the receiver path. The second adjustment changes the tilt of the roller relative to the travel of the receiver web. The registration of a color plane front to back and tilt can be made independently of one another using these adjustment screws.

A linear sensor array can be positioned to detect the position of the edge of the receiver near the adjustment roller. A drive means can be secured to the adjustment mechanism to allow for the correction of the web path over time. The printer memorizes a set-up or nominal position and then makes correction to the adjustment screw to maintain a constant position of the receiver's path.

Operation of the present invention is believed to be apparent from the foregoing description, but a few words will be added for emphasis. The image source record 16 progresses through the scanning stations by first passing the prescanning station 24 where a variable color mix is determined for each image by the CCD scanner 30 and the color balance controller 32. The image record 16 proceeds onto the yellow scanning station 12Y where the primary filter 20Y removes a preselected amount between about 90 to 100% of the white light components not absorbed by the associated dye deposited by the yellow printing station 36Y. The secondary color balance filters 20Y having absorption of the white light components absorbed by both of the color balance filters 22Y the range of about 90 to 100%. The image source 16 proceeds to the magenta and cyan scanning stations. The color balance controller 32 transmits color mix information as the source image moves through the scanning stations, and actuates the variable filters to improve the printed quality of the image source. The color balance controller 32 is in communicating the control electronics 34 for the scanners 14 and for the print heads 48.

The movement of the dye receiving member 40 is synchronized with the advancing movement of the image source 16. Because each printing station only prints one color, a complete reproduced image must proceed in succession through each thermal printing station. The synchronization is made possible by the capstan roller 44 positioned upstream of the thermal dye transfer stations 36. The capstan roller 44 meters the dye receiver 40 to the thermal dye transfer stations. The printing platens 46 are controlled by a drive means and clutch means which tension the dye receiving member 40 while the dye receiving member 40 is metered by the capstan roller 44. To control the path of the receiver 40, there are two roller assemblies 52, 54 positioned between adjacent print 36 to define the path of the dye receiver for proper color registration. The skewing or length of the receiver path can be made independently of adjusting the tension the roller exerts on the receiver. A quality print requires not only synchronization of the image source 16 with the receiver 40, but also requires that the receiver 40 traverse the proper path by the printing platens 46 for accurate color plane alignment.

It can now be appreciated that a scanning thermal dye printer has been presented. The printer has a plurality of linear scanning arrays positioned to scan color information from a source image. Thermal dye transfer stations are responsive to information from the linear scanning arrays. Means for advancing the source image between successive linear scanning arrays and means for advancing a dye receiving member between successive dye transfer stations are provided. Also provided are means for synchronizing advancing movement of the dye receiving member with advancing movement of the source image.

The synchronizing means may include a capstan roller disposed upstream of the series of thermal dye transfer stations to meter the dye receiving member to the thermal dye transfer stations. The synchronizing means may feature drive means and clutch means disposed on a platen at each of the thermal dye transfer stations to tension the dye receiving member while the dye receiving member is metered by the capstan roller.

While the invention has been described with particular reference to the preferred embodiments, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

It can now be appreciated that there has been presented a scanning thermal dye printer. The printer comprises a plurality of linear scanning arrays positioned to sequentially scan selective color information from a source image and produce a color plane using the selective color information, and a plurality of thermal dye transfer stations. Each thermal dye transfer station is responsive to information from a selected one of the linear scanning arrays. The printer includes means for advancing the source image between successive linear scanning arrays, and means for advancing a dye receiving member between successive dye transfer stations. A scanning station is positioned to scan a color input image and control dye deposited in a dye deposition station disposed to reproduce the color input image. A primary filter is adapted to remove a preselected quantity of the colors not absorbed by an associated deposited dye, and additional variable density filters provide fine control of the light components associated with the deposited dye.

What is claimed is:

1. An apparatus, comprising:
   a color station controller;
   a prescanning station for determining a color balance for an image and communicating color balance information to said color station controller;
   a scanning station positioned to scan a color input image;
   a dye deposition station associated with said scanning station to reproduce said color input image, said scanning station adapted to control dye deposited by said dye deposition station;
   a primary filter adapted to remove a preselected quantity of a color not absorbed by an associated deposited dye; and
   at least one variable density filter to provide fine control of light components associated with the deposited dye, said station controller positioning said variable density filter in response to receiving color balance information from said prescanning station.

2. An apparatus, as set forth in claim 1, wherein said primary filter contains thermal dye as a filtering agent.

3. A scanning thermal dye printer, comprising:
   a plurality of scanning stations having linear scanning arrays positioned to sequentially scan an input color image and generate color information equivalent to a dye color deposited to reproduce said input color image as an output color image;
   a white light source fat each scanning station of said plurality of scanning stations;
   a variable absorption light filter disposed between said white light source and an associated linear scanning array of said scanning arrays facilitating color balancing to include light components not associated with deposited dye;
   a color station controller for positioning said variable density filter in response to receiving color balance information;
   a plurality of thermal dye transfer stations, each one of said plurality of thermal dye transfer stations being responsive to information from a selected one of said plurality of linear scanning stations to reproduce said input color image as said output color image;
   a prescanning station for determining a variable color mix for an input image;
   adjustment means on said variable absorption light filter for changing color balance; and
   control means disposed to receive information on color mix on an image by image basis and actuate the adjustable variable light filter to improve quality o the output color image by changing said color balance with said adjustment means.

4. An apparatus, comprising:
   a plurality of scanning stations positioned to sequentially scan an input image and generate color information equivalent to dye colors;
   a series of thermal dye deposition stations disposed to receive said color information from respective scanning stations and to reproduce said input color image as an output color image from a deposition of dye;
   a source of white light;
   a primary filter removing a preselected amount of a white light component not absorbed by an associated deposited dye; and
   at least one variable density filter having an absorption of the white light components absorbed by the deposited dye in a preselected range.

5. An apparatus, as set forth in claim 4, wherein said primary filter removes a majority of the white light component that is not absorbed by the associated deposited dye.

6. An apparatus, as set forth in claim 4, wherein said primary filter removes at least ninety per cent of the white light component that is not absorbed by the associated deposited dye.

7. An apparatus, as set forth in claim 4, wherein said at least one variable density filter removes from about zero to about ten per cent of a primary color absorbed by an associated dye.

8. An apparatus, as set forth in claim 4, including a second variable density filter, said variable density filters removing from about zero to about ten per cent of two primary colors absorbed by an associated dye.

9. An apparatus, as set forth in claim 4, wherein said primary filter contains thermal dye as a filtering agent.

10. An apparatus, as set forth in claim 4, including:
    a color station controller; and
    a prescanning station for determining a color balance for an image and communicating color balance information to said color station controller.

11. An apparatus, a set froth in claim 4, wherein a color station controller positions said variable density filter in response to receiving color balance information.

12. An apparatus, as set forth in claim 4, including adjustment means on said variable absorption filter for changing color balance.

13. An apparatus, as set forth in claim 4, including control means disposed to receive information on color mix on an image by time basis and actuate the variable filter to improve printed quality of the output color image.

14. An apparatus, as set forth in claim 4, including:
    a prescanning station for determining a variable color mix for each time;
    adjustment means on said variable absorption filter for changing color balance; and
    control means disposed to receive information on color mix on an image by image basis and actuate the adjustable variable filers to improve printed quality of the output color image.

* * * * *